(12) United States Patent
Raz

(10) Patent No.: US 11,176,041 B2
(45) Date of Patent: Nov. 16, 2021

(54) RECONFIGURABLE CACHE ARCHITECTURE AND METHODS FOR CACHE COHERENCY

(71) Applicant: Next Silicon Ltd, Tel Aviv (IL)

(72) Inventor: Elad Raz, Ramat Gan (IL)

(73) Assignee: Next Silicon Ltd., Tel Aviv (IL)

( * ) Notice: Subject to any disclaimer, the term of this patent is extended or adjusted under 35 U.S.C. 154(b) by 0 days.

(21) Appl. No.: 16/054,202

(22) Filed: Aug. 3, 2018

(65) Prior Publication Data

US 2019/0042427 A1 Feb. 7, 2019

Related U.S. Application Data

(60) Provisional application No. 62/540,854, filed on Aug. 3, 2017.

(51) Int. Cl.
*G06F 12/0815* (2016.01)
*G06F 12/0893* (2016.01)

(52) U.S. Cl.
CPC ...... *G06F 12/0815* (2013.01); *G06F 12/0893* (2013.01); *G06F 2212/1032* (2013.01); *G06F 2212/601* (2013.01)

(58) Field of Classification Search
CPC ............. G06F 12/0815; G06F 12/0893; G06F 12/0806; G06F 12/0842; G06F 2212/1032; G06F 2212/601; G06F 2212/27; G06F 2212/282; G06F 2212/283; G06F 2212/62; G06F 13/1652; G06F 13/1663
See application file for complete search history.

(56) References Cited

U.S. PATENT DOCUMENTS

| | | |
|---|---|---|
| 5,321,806 A | 6/1994 | Meinerth et al. |
| 5,367,653 A | 11/1994 | Coyle et al. |
| 6,347,346 B1 | 2/2002 | Taylor |
| 6,370,619 B1 * | 4/2002 | Ho ........................ G06F 12/121 711/129 |
| 6,493,800 B1 | 12/2002 | Blumrich |
| 7,269,174 B2 | 9/2007 | Olson et al. |
| 8,156,307 B2 | 4/2012 | Wallach et al. |
| 8,230,176 B2 | 7/2012 | Li |
| 8,275,973 B2 | 9/2012 | Toi et al. |
| 8,504,778 B2 | 8/2013 | Kim |
| 8,589,628 B2 | 11/2013 | Kim |
| 8,621,151 B2 | 12/2013 | Kim |
| 8,656,114 B2 | 2/2014 | Kim |
| 8,767,501 B2 | 7/2014 | Joshi et al. |
| 8,874,847 B2 | 10/2014 | Kim |

(Continued)

OTHER PUBLICATIONS

International Search Report and Written Opinion of International Searching Authority for PCT/US2018/045131, ISA/RU, Moscow, Russia, dated Nov. 29, 2018.

(Continued)

*Primary Examiner* — Tracy A Warren

(57) ABSTRACT

A method for cache coherency in a reconfigurable cache architecture is provided. The method includes receiving a memory access command, wherein the memory access command includes at least an address of a memory to access; determining at least one access parameter based on the memory access command; and determining a target cache bin for serving the memory access command based in part on the at least one access parameter and the address.

24 Claims, 7 Drawing Sheets

(56) References Cited

U.S. PATENT DOCUMENTS

| | | |
|---|---|---|
| 8,949,550 B2 | 2/2015 | Choi et al. |
| 9,317,437 B2 | 4/2016 | Kim |
| 9,348,756 B2 | 5/2016 | Kim |
| 9,460,012 B2 | 10/2016 | Pricopi et al. |
| 2002/0133673 A1* | 9/2002 | Jeddeloh ............. G06F 12/0888 |
| | | 711/138 |
| 2003/0093622 A1* | 5/2003 | Desota ................ G06F 12/0848 |
| | | 711/129 |
| 2004/0034750 A1 | 2/2004 | Horn |
| 2004/0215883 A1* | 10/2004 | Bamford ........... G06F 16/24552 |
| | | 711/129 |
| 2007/0288708 A1 | 12/2007 | Saha et al. |
| 2009/0313436 A1* | 12/2009 | Krishnaprasad .... G06F 12/0802 |
| | | 711/129 |
| 2010/0332761 A1* | 12/2010 | Li ...................... G06F 12/0893 |
| | | 711/129 |
| 2011/0099562 A1 | 4/2011 | Nandy et al. |
| 2015/0234744 A1 | 8/2015 | Pricopi et al. |
| 2016/0004638 A1* | 1/2016 | Lewsey ................... G06F 12/02 |
| | | 711/122 |
| 2016/0103767 A1* | 4/2016 | Banerjee ............. G06F 12/0868 |
| | | 711/118 |
| 2016/0110287 A1 | 4/2016 | Bronson et al. |
| 2016/0140041 A1* | 5/2016 | Niu ........................... G06F 3/06 |
| | | 711/103 |
| 2017/0083237 A1 | 3/2017 | Potash |
| 2017/0116118 A1* | 4/2017 | Artieri .................. G06F 12/084 |

OTHER PUBLICATIONS

Search Report and Written Opinion dated Feb. 2021 From the Intellectual Property Office of Singapore, IPOS Re. Application No. 11202000763T. (8 Pages).

Supplementary European Search Report and the European Search Opinion dated Mar. 4, 2021 From the European Patent Office Re. Application No. 18840560.9. (11 Pages).

Kessler et al. "Page Placement Algorithms for Large Real-Indexed Caches", ACM Transactions on Computer Systems, TOCS, XP058185810, 10(4): 338-359, Nov. 1, 1992.

\* cited by examiner

RECONFIGURABLE CACHE ARCHITECTURE AND METHODS FOR CACHE COHERENCY

CROSS-REFERENCE TO RELATED APPLICATIONS

This application claims the benefit of U.S. Provisional Application No. 62/540,854 filed on Aug. 3, 2017, the contents of which are hereby incorporated by reference.

TECHNICAL FIELD

The disclosure generally relates to memory architectures, and more specifically to embedded computing architectures and configurable computing architectures.

BACKGROUND

In a shared memory multi-core processor with a separate cache memory for each processor, it is possible to have many copies of shared data: one copy in the main memory and one in the local cache of each processor that requested a copy of the data. When one of the data copies is changed, the other copies must reflect that change.

Cache coherence is the uniformity of shared resource data that requires multiple local caches. When clients (e.g., processor cores) in a system maintain local caches of a common memory resource, problems may arise with incoherent data, e.g., the local caches have different values of a single address location.

An example conventional architecture 100 for implementing cache coherence is shown in FIG. 1. Each processor core 110-1 through 110-M (hereinafter referred to individually as a processor core 110 and collectively as processor cores 110 for simplicity purposes) is associated with a corresponding local cache 120-1 through 120-M (hereinafter referred to individually as a local cache 120 and collectively as local caches 120 for simplicity purposes). All core processors 110 and their corresponding local caches 120 access a shared memory 130.

As the memory 130 is shared by the multiple processor cores 110 (and their respective local caches 120), when accessing the shared memory 130, a processor core (e.g., the core 110-1) generally needs to copy a data block from the shared memory 130 to its own cache (e.g., the cache 120-1) in order to accelerate data access. When multiple processor cores 110 access the shared memory 130, a copy of the data block in the shared memory 130 exists in the local caches 120 of all such processor cores 110. To maintain coherence of the copies, a cache coherence mechanism (CCM) 125 is required to manage data sharing.

Specifically, when performing a write (or store) operation on a shared data block or a copy of the shared data block, a write invalidate operation is sent to a processor core 110 that stores a copy of the shared data block, to avoid a data incoherence problem. To maintain cache coherence, the mechanism 125 records a cache status of a data block (or a data block interval). The cache status of the data block (or the data block interval) may include an access type and a sharer of the data block (or the data block interval).

The cache coherence mechanism 125 utilized in conventional architectures operates in a pipeline fashion. As such, a large portion of the processing time is spent on moving data from one area of the memory 130 to the local cache(s) 120, and from one local cache 120 to another. In addition, the conventional architecture of caching as shown FIG. 1 is static by nature and therefore, certain inefficiencies occur as the static pipeline operation does not absolutely fit every use-case.

The limitation of a shared memory resource can also be solved using a reconfigurable cache architecture. Typically, such architectures support dynamic cache partitioning at the hardware level. A reconfigurable cache architecture is typically designed to allow core processors to dynamically allocate cache resource while guaranteeing strict cache isolation among the real-time tasks.

Reconfigurable cache architectures mainly target for power reduction by using direct addressing mapping. However, such architectures do not improve the latency of memory access.

Thus, it would be advantageous to provide a processing architecture that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for cache coherency in a reconfigurable cache architecture. The method comprises receiving a memory access command, wherein the memory access command includes at least an address of a memory to access; determining at least one access parameter based on the memory access command; and determining a target cache bin for serving the memory access command based in part on the at least one access parameter and the address.

Some embodiments disclosed herein include a reconfigurable cache architecture, comprising: a memory; and a plurality of cache nodes coupled to the memory, wherein each cache node is partitioned to a plurality of cache bins, wherein access to any cache bin of the plurality of cache bins is determined based on an access parameter.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
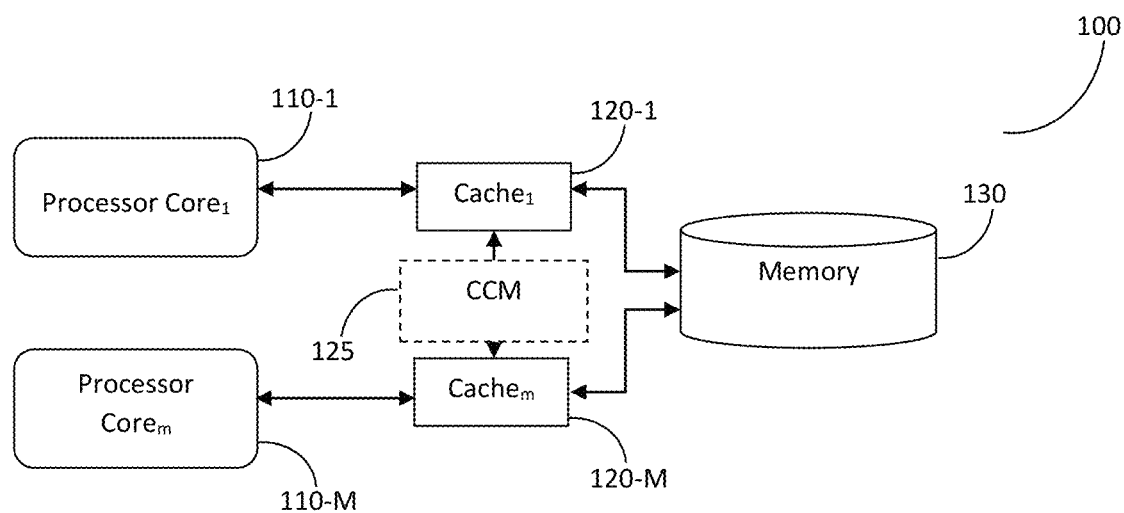
FIG. 1 is a schematic diagram demonstrating a conventional cache coherence mechanism.

In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
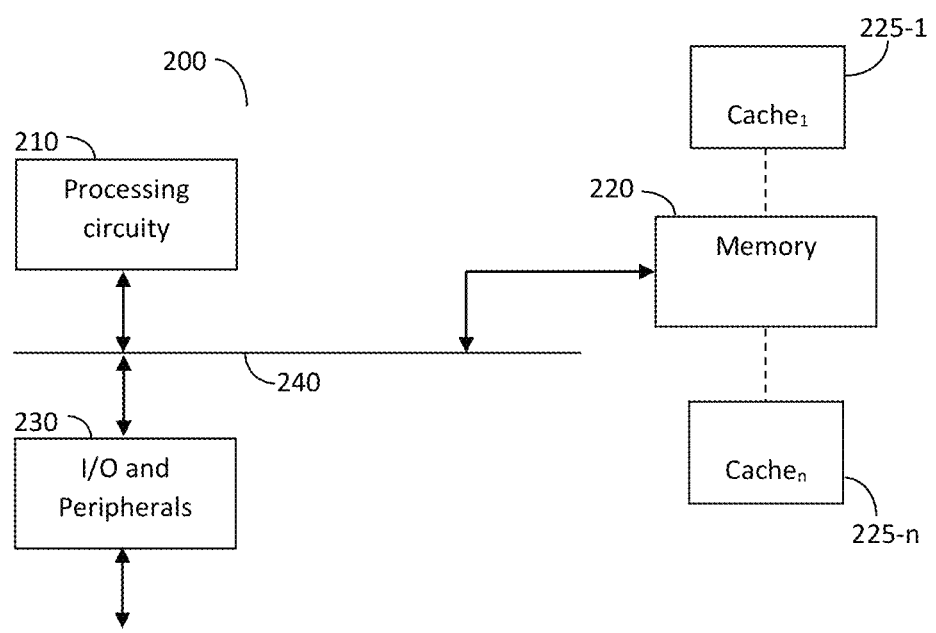
FIG. 2 is a schematic diagram of a reconfigurable system architecture according to an embodiment.

FIG. 2 illustrates an example schematic diagram of a processing architecture 200 demonstrating the operation of a reconfigurable cache in accordance with one embodiment.

In an embodiment, the processing architecture 200 includes a processing circuitry 210 coupled to a memory 220 via an interface or bus 240. An input/output (IO) and peripherals unit 230 is also connected to the interface or bus 240 to allow special functions, access to external elements, or both. The I/O and peripherals unit 230 may interface with a peripheral component interconnect (PCI) or PCI Express (PCIe) bus, co-processors, network controllers, and the like (not shown). It should be appreciated that PCIe bus enables connectivity to other peripheral devices.

The memory 220 is coupled to a plurality of cache nodes 225-1 through 225-n (hereinafter referred to individually as a cache node or collectively as cache nodes for simplicity purposes). Each cache node 225 is configured to store data processed by the processing circuitry 210 and to load data to the processing circuitry 210. Typically, access to the cache nodes 225 is performed through memory access commands, such as store (or write), load (or read). Each cache node 225 may be realized using high-speed static RAM (SRAM), dynamic RAM (DRAM), and the like. In an embodiment, each cache node 225 can be logically partitioned to a plurality of a cache bins (not shown in FIG. 2), as is discussed in detail herein below.

The processing circuitry 210 may be any processing device or computational device, such as, but not limited to, a central processing unit (CPU), a field-programmable gate array (FPGA), a graphics processing unit (GPU), a coarse-grained reconfigurable architecture (CGRA), an application-specific integrated circuit (ASIC), a quantum computer, and so on. Typically, the processing circuitry 210 is a multi-core processor. It should be noted that the processing architecture 200 can further support a plurality of processing devices 210, e.g., multiple CPUs, hybrid CPUs, and the like.

In an embodiment, the processing circuitry 210 may be realized as a reconfigurable processing architecture. Such an architecture may be realized as an array of logical elements and multiplexers (MUXs). The logical elements may include arithmetic logic units (ALUs) and functional units (FUs) configured to execute computing functions.

The processing circuitry 210 is configured to perform various processes to provide a configurable cache architecture which maintains cache coherency among the caches 225-1 through 225-n. As such, the configurable cache architecture is enabled without any additional dedicated hardware. The processing circuitry 210 providing the configurable cache also executes the main programs designed for the processing architecture 200. For example, the processing circuitry 210 may execute a computational machine learning process and run the cache coherency.

It should be appreciated that, by not using a dedicated hardware, low latency cache access and low power utilization by the processing architecture 200 is ensured. As such, the reconfigurable cache architecture, as disclosed herein, can be utilized to accelerate the operation of the processing circuitry 210 (e.g., a CPU, a FPGA, a GPU, an ASIC, etc.).

According to the disclosed embodiments, the cache coherency is achieved by determining the location of data in any of the nodes and their cache bins using a deterministic function computed over at least one access parameter. The access parameters are determined by the processing circuitry 210. An access parameter may include, for example, at least one of a unitary identification (ID) representing, a physical entity, and a logical entity. Examples for such entities include, a process ID, a thread ID, a core ID, a cache bit, a source instruction point, a memory port ID, the memory access address, or a combination thereof. The type of the access parameter may be assigned based on the type of memory being accessed. For example, bins of shared memory may be accessed through, for example, at least one cache bit, while bins of local memory can be accessed through at least one process ID. The type of access parameter may be determined during compilation or at runtime.

In an embodiment, the processing circuitry 210 is configured to receive a memory access command, to determine the access parameter, and to determine the target cache bin based on the access parameter and address designated in the memory access command. As a non-limiting example, a deterministic function, e.g., a hash function, a set of ternary content-addressable memory (TCAM) match rules, a combination thereof, and the like, is computed over the address and the access parameter is called to decide which cache bin of the cache nodes 225 maintains the data.

For example, a store command may be received at the processing circuitry 210 through the I/O and peripherals unit 230. Such a command may include a data block and a memory address in which to save the data block. The processing circuitry 210 is configured to determine if the command is associated with, for example, a particular process. If so, the process ID of the process is used as an access parameter. A function computed over the address and process ID (serving as an access parameter) is used to determine the target cache bin for storing the data block. It should be noted that a thread-ID, a core-ID, a cache bit, and so on, can be used as an access parameter. For example, if the received stored command is associated with a particular thread, then a thread-ID will be utilized.

It should be appreciated that the system architecture 200 described hereinabove depicts a single computational device for the sake of simplicity, and that the architecture 200 can be equally implemented using a plurality of computational devices such as, e.g., CPUs, GPUs, combinations thereof, and so on.

In an embodiment, the processing circuitry 210 is configured to determine which of the cache nodes 225 should be partitioned, and is further configured to partition each node 225. That is, the processing circuitry 210 is configured to determine how many bins to partition the cache node 225, and the size of each partition. In an embodiment, the partitioning may be static, e.g., to a pre-defined number of bins having equal size. In another embodiment, the partitioning may be dynamic, where the allocation is based on the utilization of each cache bin. To this end, after each execution iteration, the utilization of each bin is measured, and based on the measured utilization, it is determined whether the bins' allocation should be modified. It should be noted that the measurement can be made after program termination or during runtime. For example, the size of popular bins may be increased, while the size of less popular bins is reduced. Further, the number of bins may be increased or decreased based on the measured utilization.

In certain embodiments, some cache nodes 225 may be statically partitioned, while other may be dynamically partitioned. It should be noted that, initially, the cache may be statistically partitioned, and as the program runs, the allocation of the bins may be dynamically modified.

In an embodiment, the cache address is divided among the cache bins. Each cache partition of the cache nodes 225 can be assigned a different logical or physical entity. For example, the cache node 225-1 can be partitioned into two cache bins, with one cache bin dedicated to a first process and the other cache bin dedicated to a second process of a program. Alternatively, the cache bin can be assigned to processor cores of the processing circuitry 210. Other examples of entities that can be allocated cache bins include threads. A partitioning of a cache node to bins is further illustrated in FIG. 3.

It should be appreciated that this list is only illustrative and not exhaustive of the many types of logical entities and physical entities that can be assigned to cache bins. It should be further appreciated that a cache bin may be any portion of a cache node.

Figure 3A:
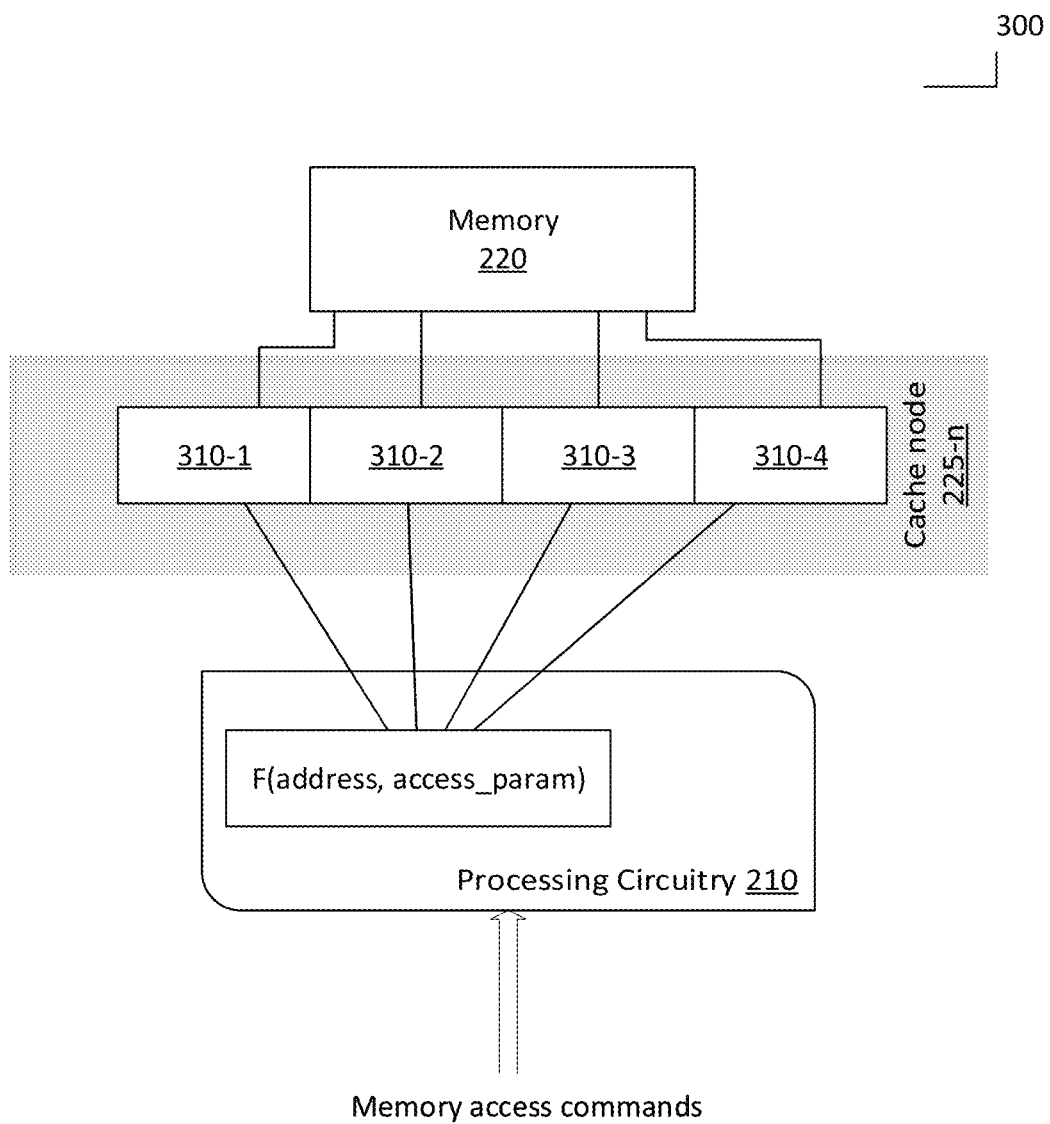
FIGS. 3A-3C are schematic diagrams of a reconfigurable cache architecture according to an embodiment.
Figure 3B:
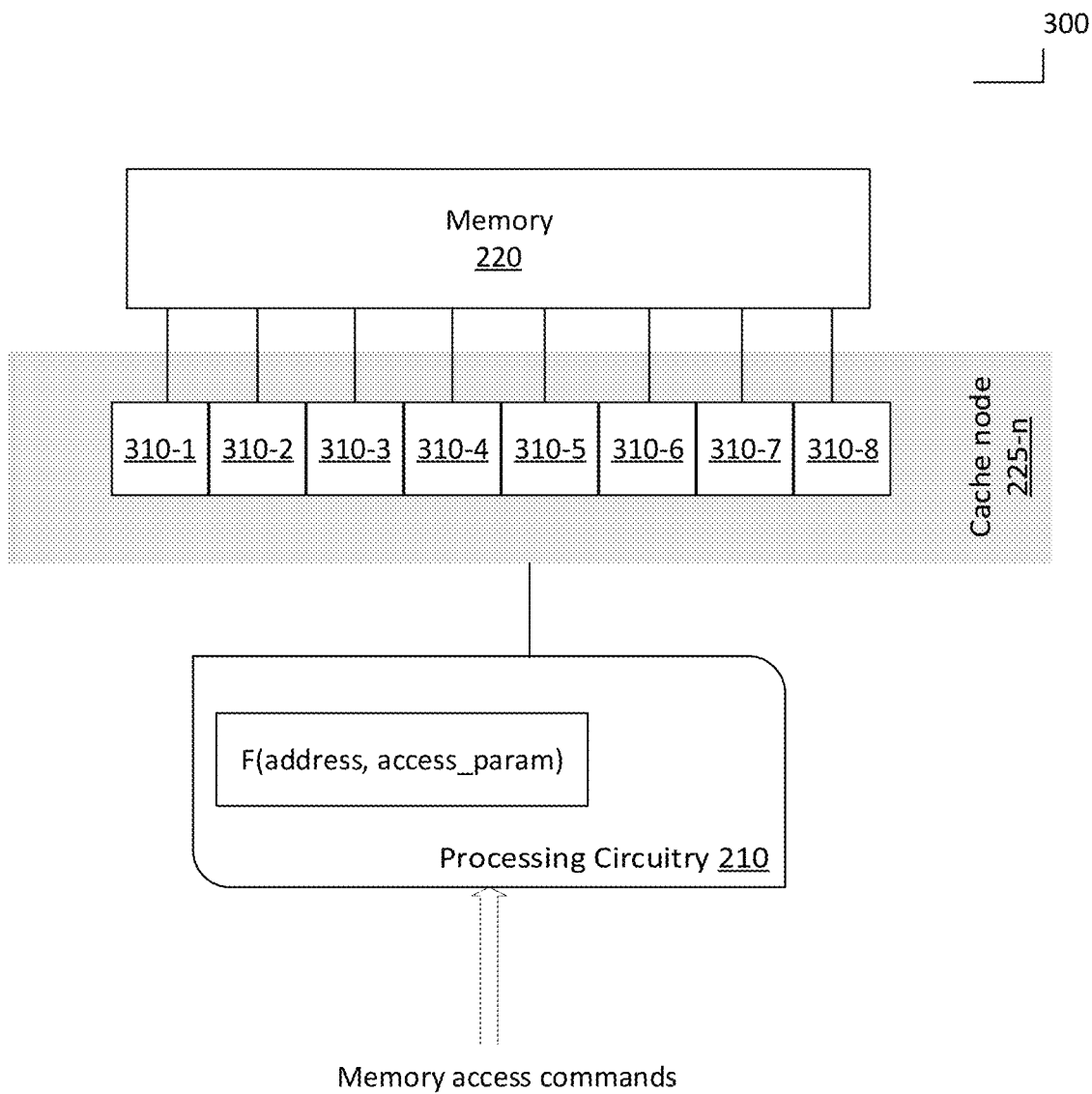
Figure 3C:
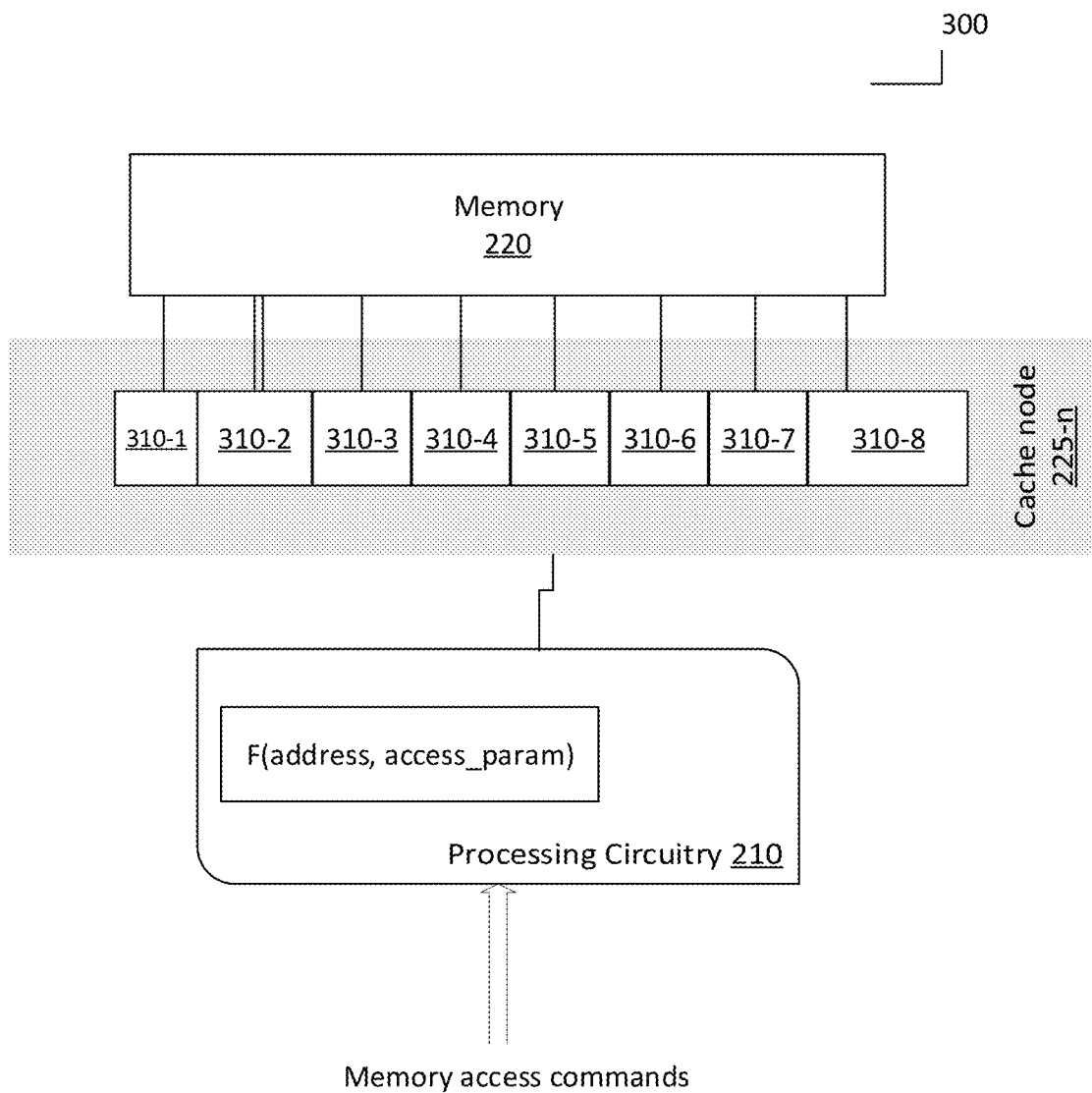

FIGS. 3A-3C illustrate an example schematic diagram of a reconfigurable cache architecture 300 according to an embodiment. In the example illustrated in FIGS. 3A-3C, a single cache node 225-n is shown being dynamically partitioned to a number of bins 310.

Specifically, as shown in FIG. 3A, the cache node 225-n is initially partitioned to 4 cache bins 310-1, 310-2, 310-3 and 310-4 having similar sizes. After a first execution iteration, during runtime or between runs, the partitioning of the node 225-n is changed to include 8 bins 310-1 through 310-8 having similar sizes (FIG. 3B). After another execution iteration, during runtime or between runs, the partitioning of the node 225-n changes to include 8 bins 310-1 through 310-8, but with different sizes. As shown in FIG. 3C, the memory allocated to bin 310-1 is different than bin 310-8.

According to an embodiment, the cache architecture 300 may be distributed over multiple physical nodes where each node is further divided into one or more logical bins. A processing circuitry of each physical node may access all or part of the cache nodes.

As shown in FIGS. 3A through 3C, a deterministic hash function 225 is utilized to determine a target cache. The function 325 is computed by the processing circuitry 210. It should be appreciated that the reconfigurable cache architecture 300 enables a higher granularity of memory usage, therefore enhancing the system operation and improving runtime performance.

It should be further appreciated that the reconfigurable cache architecture 300 depicts a single cache node 225-n and a number of 4 or 8 bins 310 merely for the sake of simplicity. The architecture 300 would typically include a plurality of cache nodes that can be partitioned into any number of cache bins.

In an embodiment, a memory cache bin 310 may perform atomic memory access commands. Such commands may load, conditionally modify, and thereafter store the value of memory at a location, as a single operation. It is to be appreciated that when multiple atomic memory access commands are executed in parallel from multiple memory ports, and performed sequentially at the cache bin, they provide a coherent view to all memory ports.

Figure 4:
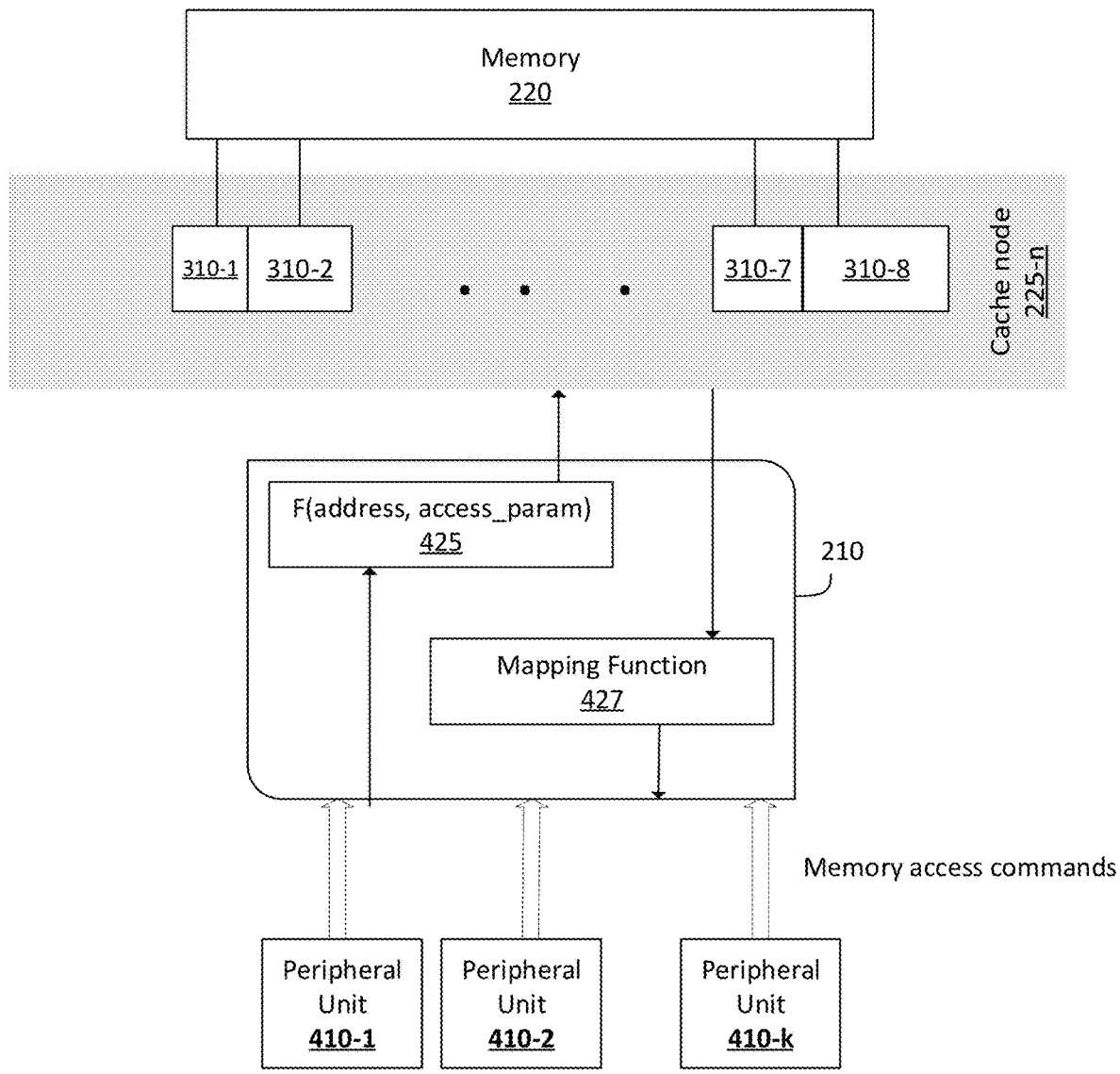
FIG. 4 is a schematic diagram of I/O peripherals unit coupled to a reconfigurable cache architecture according to an embodiment.

FIG. 4 shows an example schematic diagram of a reconfigurable cache architecture 400 coupled to I/O peripherals (I/O P) 410 according to an embodiment. In this configuration, input/output (IO) and peripheral units 410-1 through 410-k (k is integer greater or equal to 1) may include a PCI bus, a PCI Express (PCIe), one or more co-processors, one or more network controllers, and the like.

As shown herein, the memory access commands are issued by the I/O peripherals 410. The processing circuitry 210 determines the target cache bin based in part on the received commands using a deterministic hash function 425.

In this configuration, any data or control signal (e.g., ack signal) received from the target cache bin is mapped to the I/O peripheral 410 that issued the received command. The mapping is performed by a mapping function 427 that can be implemented as a deterministic hash function, as a set of ternary content-addressable memory (TCAM) match rules, a combination thereof, and the like. It should be noted that the memory access is directed to the local caches 120 in order to perform the memory operation.

Figure 5:
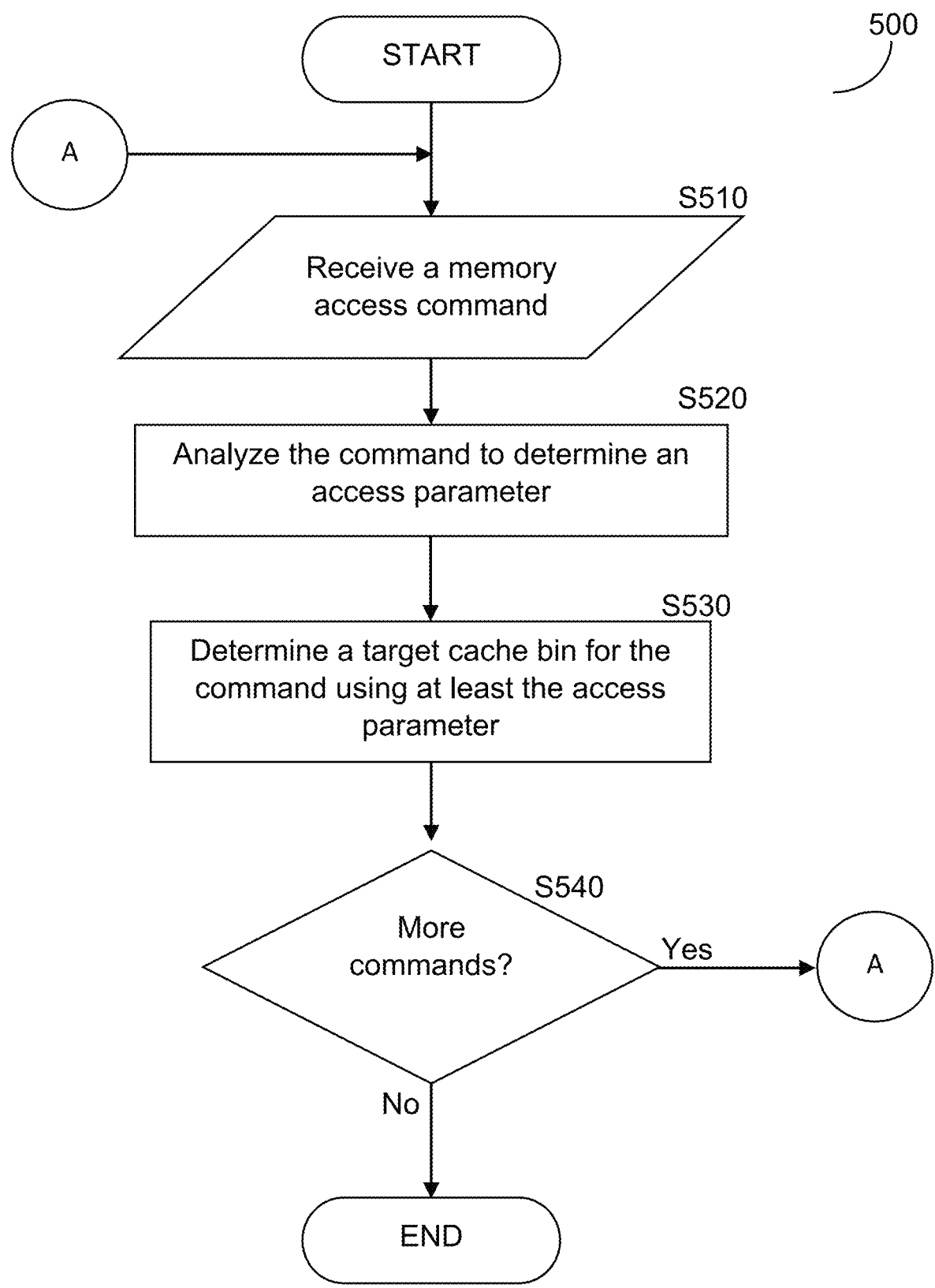
FIG. 5 is a flowchart illustrating a method for cache coherency in a reconfigurable cache according to an embodiment.

FIG. 5 shows an example flowchart 500 of a method for cache coherency in a reconfigurable cache architecture according to an embodiment. The reconfigurable cache architecture includes a plurality of cache nodes coupled to the memory, wherein each cache node is partitioned into a plurality of cache bins.

At S510, a memory access command is received. As mentioned above, the command may be to store (write) or load (read) data from the memory of a processing architecture. The command may be received via an interface such as, for example, the I/O peripherals unit 230. A received command includes at least a target address to which data is to be stored or from which data is to be loaded. In a store command, the data to be stored is also included in the received command. The memory address should be within the address boundaries determined during compilation of the code of the main program.

At S520, at least one access parameter is determined. As noted above, an access parameter may include a process ID, a thread ID, a cache bit, a storage pointer, a process core ID, and so on. In an embodiment, the determination includes determining a logical or physical entity that the received command is associated with. Examples for physical entities are discussed in detail above.

In an embodiment, if the received command is executed as part of a dedicated process or thread (both are considered logical entities), then the process-ID or thread-ID will be considered as the access parameter. In another embodiment, if the received command is executed on a dedicated processing core (considered a physical entity), then the core-ID will be considered as the access parameter. In yet another embodiment, if the received command is to access a shared memory (considered as a physical entity), then a cache bit will be considered as the access parameter.

In some embodiments, load/store attributes are determined. Such attributes include, for example, never cache certain values, always cache certain values, always check certain values, and so on. Furthermore, ordering of allocation, along with the access synchronization in the grid allows larger pipelines and higher throughput while simplifying mechanisms. Such attributes are advantageous for volatile memory as well as for locking mechanisms.

At S530, a target cache bin to access is determined. In an embodiment, the determination is performed using a deterministic function computed over the access parameter and the address designated in the received request. According to another embodiment, the deterministic function is connected to the grid so that the determination is made using the same interfaces.

It should be noted that data is stored to, or loaded from, the target cache bin as determined by the deterministic function.

In an embodiment, S530 includes gathering the statistics about the target cache bin being accessed. For example, the number of the bin, the frequency of accessing the same bin, and the size of the data being written or read are determined. These gathered statistics can be utilized to dynamically change the partitions of the bins.

In S540, it is checked whether additional system calls have been received and if so, execution continues with S510; otherwise, execution terminates.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional data storage unit. Furthermore, a non-transitory computer readable medium is any computer readable medium except for a transitory propagating signal.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for cache coherency in a reconfigurable cache architecture, comprising:
   receiving a memory access command, wherein the memory access command includes at least an address of a memory to access;
   determining at least one access parameter based on the memory access command, wherein the at least one access parameter includes at least one of: a process ID, a processing core ID, a thread ID, and a cache bit;
   computing a deterministic function over the at least one access parameter and the address to achieve cache coherency; and
   determining a target cache bin for serving the memory access command based in part on an outcome of computing the deterministic function;
   wherein the reconfigurable cache architecture is distributed over a plurality of separate physical cache nodes, operating substantially independently and electrically coupled to the memory, wherein each cache node is partitionable into a plurality of cache bins, wherein the target cache bin is one of the plurality of cache bins, and wherein the partitioning of the plurality of cache bins within at least two of the plurality of separate physical cache nodes is reconfigurable.

2. The method of claim 1, wherein the target cache bin is at least a portion of at least one cache node.

3. The method of claim 1, wherein each cache bin is included in a respective cache node of the plurality of separate physical cache nodes.

4. The method of claim 1, further comprising:
   dynamically partitioning each cache node into at least two cache bins based on utilization of the respective plurality of cache bins of the cache node.

5. The method of claim 4, further comprising:
   initially partitioning each cache node into a predetermined number of cache bins;
   collecting statistics with respect to the usage of each cache bin; and
   reconfiguring the initial partitioning of each cache node based on the collected statistics.

6. The method of claim 5, wherein the reconfiguration of the partitioning of each cache node is performed after each execution iteration.

7. The method of claim 5, further comprising:
   dynamically allocating more cache storage to at least one of the cache bins.

8. The method of claim 1, wherein the memory access command includes a unitary identification of any one of: a physical entity and a logical entity.

9. The method of claim 8, wherein the physical entity is any one of: a processing core, and a shared portion of the memory.

10. The method of claim 9, wherein the logical entity is any one of: a process, or and a thread.

11. The method of claim 8, wherein the determination further comprises:
    determining if the memory access command is associated with the logical entity; and
    setting the access parameter as a logical entity identifier when it is determined that the memory access command is associated with the logical entity.

12. The method of claim 8, wherein the determination further comprises:
    determining if the memory access command is associated with the physical entity; and
    setting the access parameter as a physical entity identifier when it is determined that the memory access command is associated with the physical entity.

13. The method of claim 11, further comprising:
    determining at least one cache attribute, wherein the at least one cache attribute includes at least one of: a never cache certain value, an always cache certain value, or an always check certain value.

14. The method of claim 1, wherein the reconfigurable cache architecture is utilized to accelerate an execution of a program by a processing circuitry.

15. The method of claim 14, wherein the processing circuitry is any one of:
    a central processing unit (CPU), a field-programmable gate array (FPGA), a graphics processing unit (GPU), a coarse-grained reconfigurable architecture (CGRA), an application-specific integrated circuit (ASIC), multi-core processor, or and a quantum computer.

16. A non-transitory computer readable medium having stored thereon instructions for causing at least one processing circuitry to execute a process for cache coherency in a reconfigurable cache architecture, the process comprising:
    receiving a memory access command, wherein the memory access command includes at least an address of a memory to access;
    determining at least one access parameter based on the memory access command, wherein the access parameter is one of: a process ID, a processing core ID, a thread ID, and a cache bit; and computing a deterministic function over the at least one access parameter and the address to achieve cache coherency; and determining a target cache bin for serving the memory access command based in part on an outcome of computing the deterministic function;

wherein the reconfigurable cache architecture is distributed over a plurality of separate physical cache nodes, operating substantially independently and electrically coupled to the memory, wherein each cache node is partitionable into a plurality of cache bins, wherein the target cache bin is one of the plurality of cache bins, and wherein the partitioning of the plurality of cache bins within at least two of the plurality of separate physical cache nodes is reconfigurable.

17. A reconfigurable cache architecture, comprising:

a memory; and a plurality of separate physical cache nodes, operating substantially independently and electrically coupled to the memory, wherein each cache node is partitionable partitioned to a plurality of cache bins, wherein access to any cache bin of the plurality of cache bins is determined based on an access parameter, wherein the access parameter is one of: a process ID, a processing core ID, a thread ID, and a cache bit, and comprises computing a deterministic function over the access parameter to achieve cache coherency, and wherein the partitioning of the plurality of cache bins within at least two of the plurality of separate physical cache nodes is reconfigurable.

18. The reconfigurable cache architecture of claim 17, wherein the access parameter includes at least one of: a process ID, a processing core ID, a thread ID, and a cache bit.

19. The reconfigurable cache architecture of claim 17, wherein each cache bin is any portion of the respective cache node.

20. The reconfigurable cache architecture of claim 17, wherein the reconfigurable cache architecture is coupled to a processing circuitry, wherein the processing circuitry is configured to:

dynamically partition each cache node into at least two cache bins based on utilization of the respective plurality of cache bins.

21. The reconfigurable cache architecture of claim 20, wherein the processing circuitry is configured to:

initially partition each cache node into a predetermined number of cache bins;

collect statistics with respect to the usage of each cache bin; and reconfigure the initial partitioning of each cache node based on the collected statistics.

22. The reconfigurable cache architecture of claim 20, wherein the reconfiguration of the partition of the plurality of separate physical cache nodes is performed after each execution iteration.

23. The reconfigurable cache architecture of claim 20, wherein the processing circuitry is configured to:

dynamically allocate more cache storage to at least one of the cache bins.

24. The reconfigurable cache architecture of claim 17, wherein the reconfigurable cache architecture is utilized to accelerate an execution of a program by a processing circuitry.

* * * * *